Oct. 6, 1936. C. H. FRINK Re. 20,125

SNOW PLOW ATTACHMENT FOR MOTOR TRUCKS

Original Filed Oct. 20, 1930 3 Sheets-Sheet 1

INVENTOR
C. H. Frink

WITNESS
J. J. Mains

BY
Theodore E. Simonton
ATTORNEY

Oct. 6, 1936. C. H. FRINK Re. 20,125

SNOW PLOW ATTACHMENT FOR MOTOR TRUCKS

Original Filed Oct. 20, 1930 3 Sheets-Sheet 2

INVENTOR
C. H. Frink

WITNESS
J. T. Mains

BY
Theodore E. Simonton
ATTORNEY

Oct. 6, 1936. C. H. FRINK Re. 20,125

SNOW PLOW ATTACHMENT FOR MOTOR TRUCKS

Original Filed Oct. 20, 1930 3 Sheets-Sheet 3

WITNESS
J. J. Maina

INVENTOR
C. H. Frink
BY
Theodore E. Simonton
ATTORNEY

Reissued Oct. 6, 1936 Re. 20,125

UNITED STATES · PATENT OFFICE 20,125

SNOW PLOW ATTACHMENT FOR MOTOR TRUCKS

Carl H. Frink, Clayton, N. Y.

Original No. 1,929,548, dated October 10, 1933, Serial No. 489,983, October 20, 1930. Application for reissue September 25, 1935, Serial No. 42,166

9 Claims. (Cl. 37—44)

This invention relates to a snowplow attachment for motor trucks of the class set forth in my Patent No. 1,589,748, issued June 22, 1926, in that it comprises a main frame having releasable means for rigidly securing it to the front end of the truck to extend forwardly therefrom, and a supplemental plow-supporting frame adjustably suspended from the main frame for vertical movement relatively thereto.

The main object is to increase the efficiency and durability of an apparatus of this character so that it may be driven at a higher speed over country and city roads than has heretofore been practiced and thereby to maintain the roads in a passable condition, at all times, free from snow and ice, at a greatly reduced cost.

One of the specific objects is to bring the entire attachment into sufficiently close relation to the front end of the truck frame to prevent excessive vibration of its various parts and at the same time to cause the rear ends of the moldboards of the plow to extend some distance beyond and at opposite sides of the front end of the truck-frame for increased strength, durability and efficiency, and to obtain a shorter turning radius.

Another specific object is to converge the moldboards forward at equal angles to the longitudinal center of the truck so as to meet in the vertical plane of the center line with their upper portions forming an acute angle and thereby to reduce the resistance incidental to the forward movement of the plow through the snow and ice and permit the machine to be driven forward at a sufficiently high rate of speed to assure the deflection of the snow and ice beyond opposite sides of the roadway.

A further object is to enable the plow-supporting frame with the plow thereon to be conveniently and expeditiously raised and lowered and also tilted forward and rearward and transversely as may be required when the apparatus is traveling free or when adjusting the plow to the contour of the road bed to regulate the depth of cut.

Another object is to provide the plow-supporting frame with fulcrum-shoes adapted to ride along and upon the road surface and arranged so as to form fulcrum bearings upon the roadbed about which the frame and plow may be tilted to regulate the depth of the cut.

Other objects and advantages relating to specific parts of the apparatus will be brought out in the following description.

Figure 1:
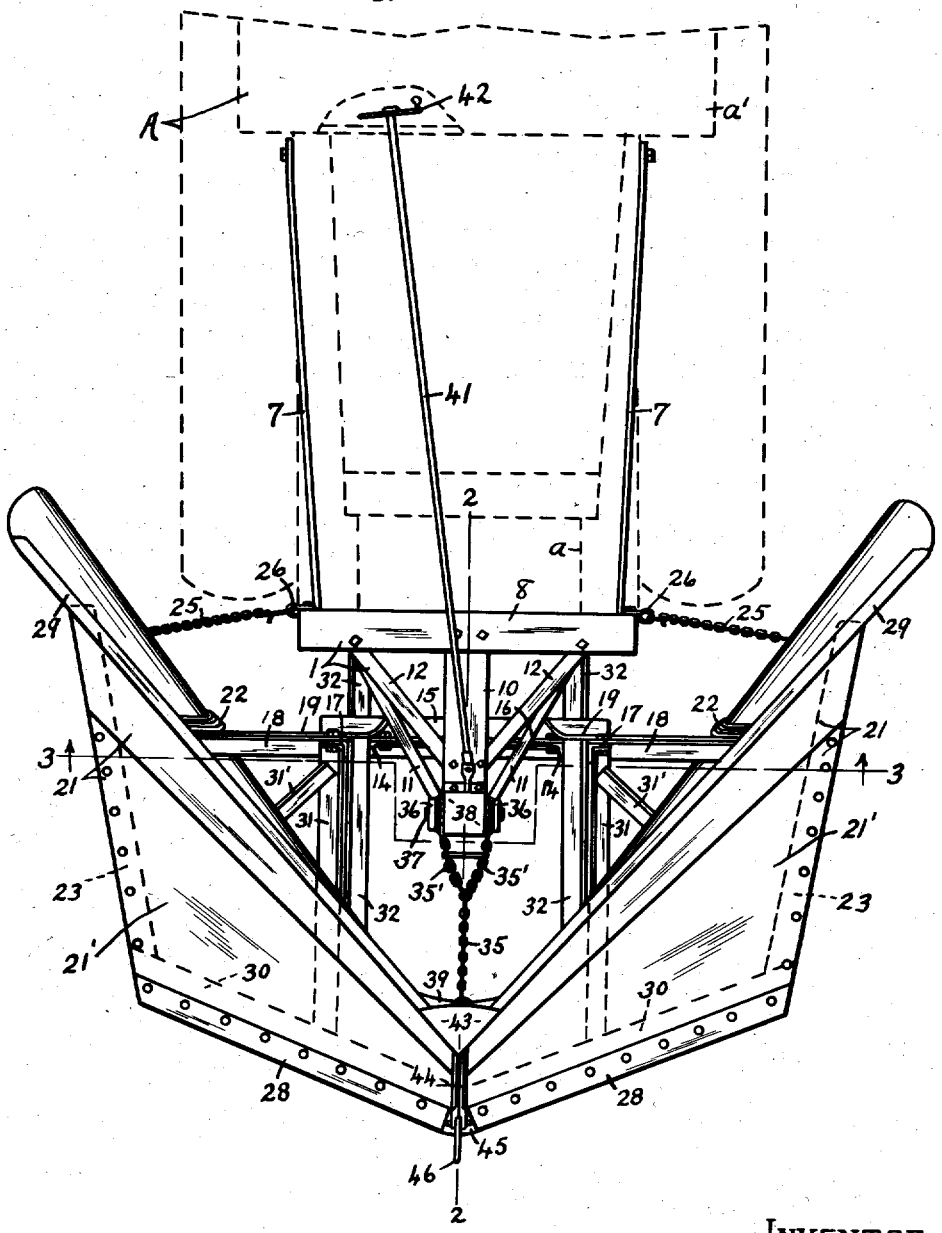
Figure 1 is a top plan of a plow attachment embodying the various features of my invention as applied to a motor truck, a part of which is shown by dotted lines.
Figure 2:
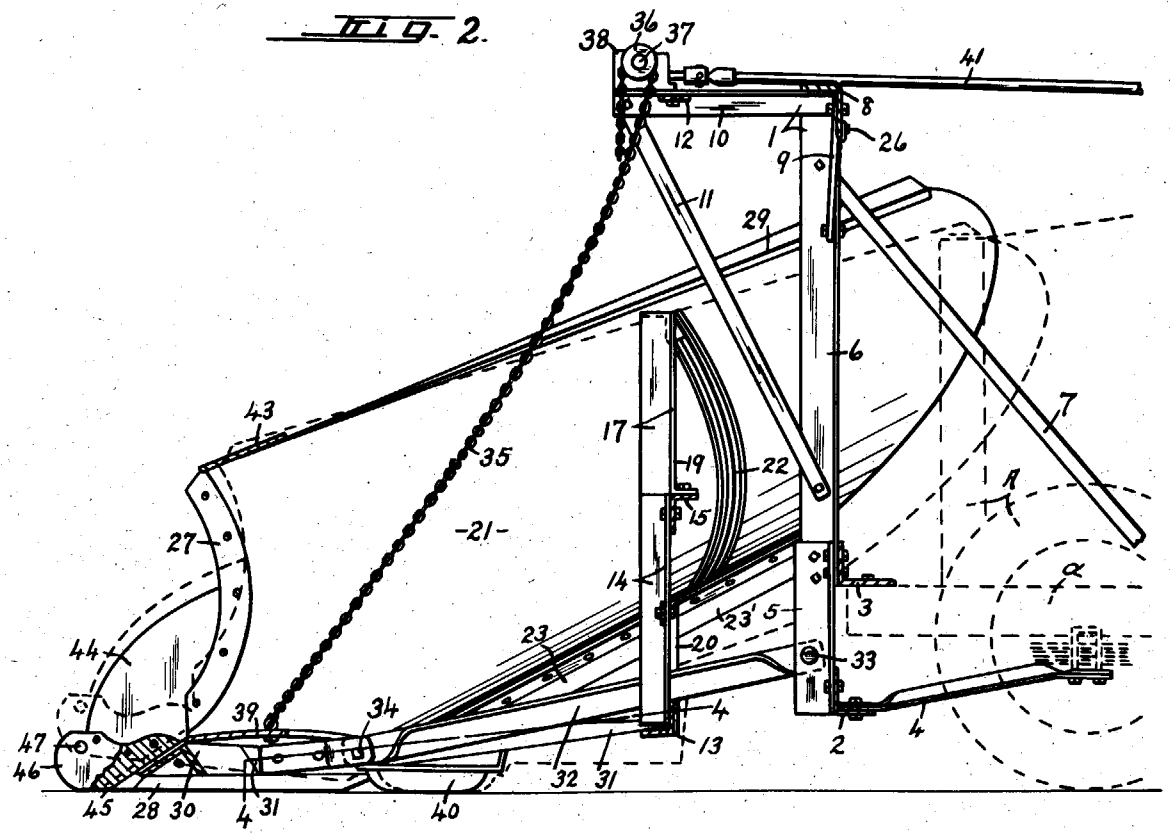
Figure 2 is a longitudinal vertical sectional view of the same apparatus taken in the plane of line 2—2, Figure 1.

As illustrated, this attachment comprises a main supporting frame 1 having lower and upper cross bars 2 and 3 adapted to be rigidly secured to the front end of the chassis frame of a motor vehicle A, shown by dotted lines in Figures 1 and 2.

The cross bars 2 and 3 preferably consist of angle irons arranged in vertically spaced parallel relation, the lower bar 2 being secured by rearward projecting braces 4 to the underside of the chassis frame *a*, as shown in Figure 2, for transmitting motion to the frame 1 as the truck is moved forward.

The cross bar 3 is bolted or otherwise secured to the front end of the frame *a* in a plane above the cross bar 2 for additionally holding the frame 1 in fixed relation to the chassis frame *a*, it being understood that the devices for securing the bars 2 and 3 to the chassis frame *a* are releasable to allow the frame 1 to be attached to and removed from the truck, when desired.

Figure 3:
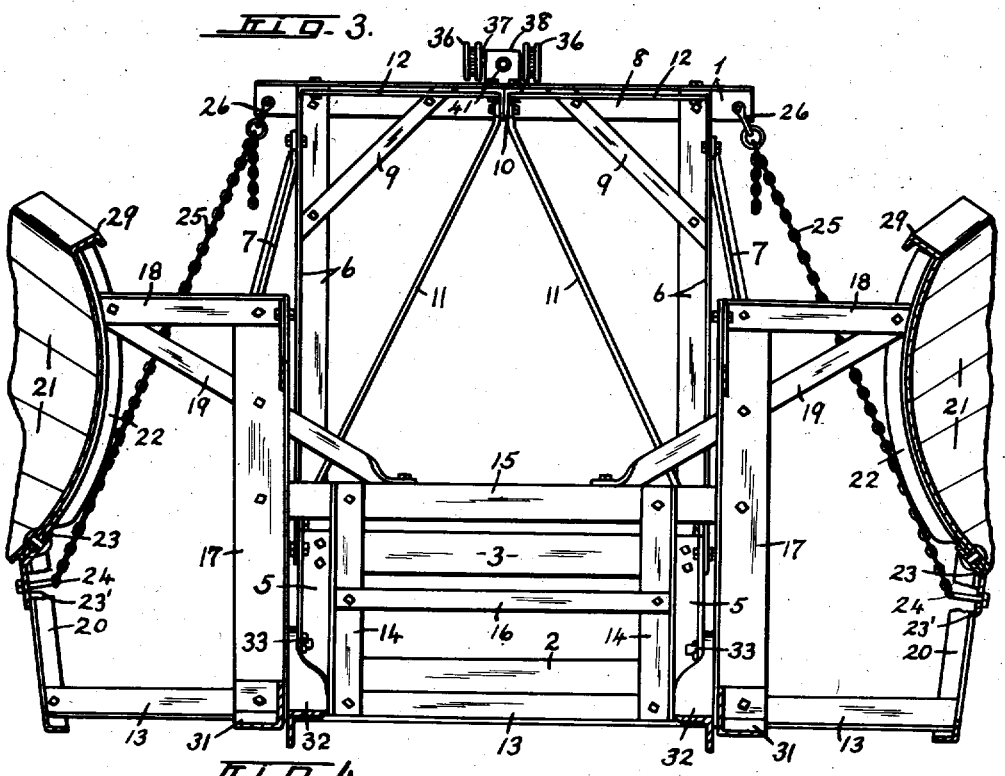
Figure 3 is an enlarged vertical sectional view taken in the plane of line 3—3, Figure 1, the outer portions of the moldboards being broken away.

The horizontal cross bars 2 and 3 extend equal distances beyond the longitudinal center of the chassis and are connected near their ends by relatively short upright bars 5, preferably consisting of angle irons riveted or otherwise permanently secured to the adjacent portions of the cross bars 2 and 3, equal distances from the longitudinal center of the machine, as shown more clearly in Figures 2 and 3.

A pair of similar upright frame bars 6 are bolted, riveted or otherwise permanently secured at their lower ends to the front faces of the cross bars 3 and to the upper ends of the frame bars 5 to extend upward equal distances therefrom in transversely spaced parallel relation and at equal distances from the longitudinal center of the machine, the upper ends of the upright bars 6 being connected by rearward and downward extending braces 7 having their lower ends bolted or otherwise secured to the chassis frame *a*, as shown more clearly in Figure 1, for holding the upright bars or posts 6 against forward and rearward vibration.

The upper ends of the upright posts 6 are connected by a cross bar 8 bolted or otherwise rigidly secured thereto and extended laterally relatively short distances beyond the same to form suitable anchorages for the flexible chains 25 which support the rear end of the plow-supporting frame hereinafter described, said cross bar 8 preferably consisting of an angle iron arranged with its open angle facing forward as shown more clearly in Figures 2 and 3.

The upright bars 6 and upper cross bar 8 are connected by diagonal braces 9 bolted or otherwise secured thereto for stiffening the adjacent portions of the main supporting frame.

A relatively short lengthwise bar or arm 10 is bolted or otherwise rigidly secured to the upper cross bar 8 midway between its ends to extend forward therefrom and has its forward end connected by braces 11 to the upright posts 6 some distance below the upper ends thereof for additionally stiffening the upper portion of the main frame and, together with the upright posts 6 and forward projecting bar 10, constitute what may be termed a crane for receiving a plow-hoisting mechanism hereinafter described, the bar 10 being arranged in the vertical plane of the longitudinal center of the chassis.

The arm 10 is connected just back of its front end to the opposite ends of the upper cross bar 8 by diagonal braces 12 to additionally stiffen the arm 10 against lateral vibration as shown in Figure 1.

*Plow-supporting frame*

The plow-supporting frame is separate from the main supporting frame for vertical movement relatively thereto and comprises a lower horizontal cross bar 13 extending transversely of the machine equal distances to opposite sides thereof and some distance beyond the lower portion of the main frame, some distance in front of but parallel with the lower cross bar.

A pair of relatively short upright posts 14 are bolted or otherwise secured to the bar 13 equal distances from the longitudinal center of the chassis to extend upward equal distances therefrom in transversely spaced parallel relation and are connected at their upper ends by a cross-bar 15 which is bolted or otherwise rigidly secured to the posts 14 in vertically spaced parallel relation to the lower bar 13, said posts 14 being connected intermediate their ends by an additional cross bar 16 which is bolted or otherwise secured thereto to stiffen the adjacent portion of the plow-supporting frame.

The upper bar 15 extends laterally equal distances beyond the posts 14 and has its outer ends bolted or otherwise rigidly secured to an additional pair of upright posts 17. The lower ends of the posts 17 are bolted or otherwise rigidly secured to the lower horizontal bar 13 to extend upwardly equal distances therefrom in transversely spaced parallel relation some distance above the upper bar 15, said posts 17 being arranged at the outer sides of the adjacent posts 14 in spaced relation thereto to permit the passage of suitable thrust bars 32, presently described, through the intervening spaces.

These upright posts 17 are provided at their upper ends with outwardly projecting laterally extending arms 18 of equal length, bolted or otherwise rigidly secured to each bar 17 at right angles thereto and having their outer ends connected by braces 19 to the upper cross bar 15 of the plow-supporting frame, said braces 19 being extended downward and inward across the rear faces of the upright posts 17 and having their intermediate portions bolted or otherwise rigidly secured thereto to assist in stiffening the adjacent portions of the plow-supporting frame, as shown in Figure 3.

The outer ends of the lower bar 13 of the plow-supporting frame are provided with similar upwardly diverging brace bars 20 bolted or otherwise rigidly secured thereto, which, together with the upper horizontal bars 18, constitute rigid supports for a pair of oppositely arranged forward converging moldboards 21 of the plow, for supporting said moldboards equal distances from and at opposite sides of the longitudinal center of the truck chassis.

Each moldboard 21 is provided on its inner side near its rear end with a transversely extending rib or flange 22 to which the outer ends of the upper horizontal bars 18 and also the braces 19 are bolted or otherwise rigidly secured, as shown more clearly in Figure 3, said bars 18 being secured to the reinforcing ribs or flanges 22 near the upper edges of the moldboards.

These reinforcing ribs 22 extend from points near the upper edges of the moldboards 21 downward to points near the lower edges thereof, as shown in Figure 2, and are permanently secured to the inner rear faces of the moldboards to assist in maintaining the concave-convex contour thereof, the lower edges of the reinforcing ribs being flattened and riveted, or otherwise secured, to the adjacent portions of the moldboards, as shown in Figure 3.

Reinforcing bars 23, preferably angle irons, are riveted or otherwise permanently secured to the inner faces of the lower edges of the moldboards 21, as shown more clearly in Figure 3, and extend substantially the entire length of the lower side edges of the moldboards, as shown in dotted lines in Figure 1 and in full lines in Figure 2. The upper ends of the brace bars 20 of the plow-supporting frame are bolted or otherwise rigidly secured to the reinforcing bars 23, to additionally hold the moldboards in equally spaced relation at opposite sides of the longitudinal center of the chassis.

Anchorages 24, such as eyebolts, are secured to the depending flanges 23′ of the reinforcing bars 23 near the rear ends thereof, and receive the lower ends of a pair of chains or cables 25. The chains 25, usually termed heel chains, are attached at their upper ends to suitable grab-hook anchorages 26 on the outer ends of the upper bar 8 of the main supporting frame, as shown more clearly in Figure 3.

As previously stated, the moldboards 21 are concave-convex in cross section, and are arranged with their concave sides facing forward and their front ends meeting in the vertical plane of the longitudinal center of the truck where they are bolted or otherwise rigidly secured to each other to form the vertically concaved cutting vertex of the plow or plow point, as shown more clearly in Figures 1 and 2. More specifically, the meeting ends of the moldboards are provided with forward projecting flanges 27 which are bolted or otherwise rigidly secured to each other to assist in holding the moldboards in fixed relation and at the proper angle to each other, as shown in Figure 2.

The lower front portions of the moldboards 21 constitute riser boards 21′ which are disposed at an obtuse angle to each other and are provided at their front edges with cutting plates 28 of hardened steel or equivalent material riveted or otherwise permanently secured to the adjacent portions of the moldboards, said cutting plates being disposed in a substantially horizontal plane for engagement with the snow and ice adjacent the roadbed. The lower front edges of the moldboards are also reinforced by the angle bars 30, welded or otherwise rigidly secured to the inner faces of the moldboards in planes slightly above the lower edges of the cutting plates 28, as shown more particularly in Figure 2.

The rear portions of the moldboards 21 are curved upward, rearward and forward and have their upper longitudinal edges bent inward to form reinforcing flanges 29 for stiffening the same, said flanged upper edges of the moldboards being preferably disposed at an acute angle to each other to reduce to a minimum the resistance incidental to the contact of the snow and ice therewith as the machine is propelled forward.

Under this construction and arrangement of the moldboards of the plow and resultant reduction of the resistance to its forward movement through the snow and ice, it is evident that the machine may be driven at a relatively high rate of speed under which the snow and ice would be rapidly deflected beyond the sides of the road or some distance to the side of the path of travel of the machine.

The lower portion of the plow-supporting frame is also provided with a pair of bars 31, preferably angle irons, arranged in transversely spaced parallel relation equal distances from, and at opposite sides of, the longitudinal center of the truck. The bars 31 have their rear ends rigidly secured by any suitable fastening means to the cross bar 13 and their front ends rigidly secured to the reinforcing bars 30, as shown more clearly in Figures 2 and 4, and serve to support the front portion of the plow. The moldboards of the plow may be additionally braced from the bars 31 by brace bars 31′, shown in part in Figure 1.

Figure 4:
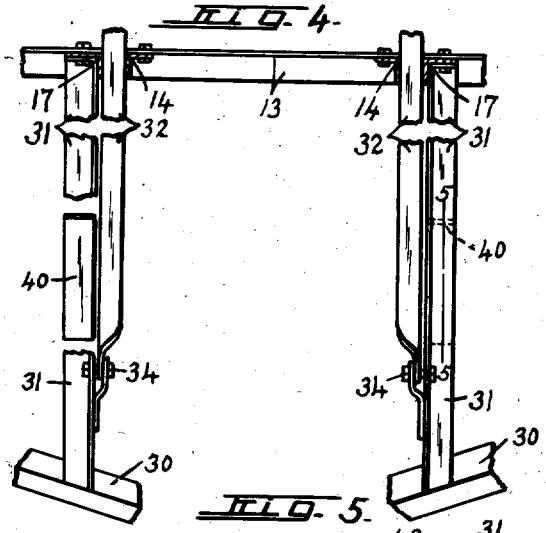
Figure 4 is a detail sectional view, partly broken away, taken in the plane of line 4—4, Figure 2.

The plow-supporting frame is connected to the main frame 1 by means of a pair of thrust or drive bars 32 arranged in transversely spaced parallel relation at equal distances from the longitudinal center of the truck to extend between the corresponding posts 14 and 17, said thrust bars having their rear ends pivoted at 33 to the lower ends of the upright posts 5 of the main supporting frame 1 and having their front ends pivoted at 34 to the lower bars 31 of the plow-supporting frame, as shown more clearly in Figures 2 and 4, thus permitting the plow-supporting frame with the plow thereon to be adjusted vertically relatively to the main frame 1.

The rear portion of the plow may be adjusted vertically through the medium of the heel chains 25, by simply engaging different links on the upper ends of the chains in the grab links 26 on opposite ends of the upper bar 8 of the main supporting frame 1.

The front end of the plow may be adjusted vertically by means of a chain or cable 35 having its upper end divided into branches 35′, which are passed over a pair of sprocket wheels 36 on a rotary shaft 37, the latter being journaled in a suitable gear case 38 on the front end of the upper lengthwise bar 10 of the plow-supporting frame as shown in Figures 1 and 2, said gear case containing a quantity of oil for lubricating the gearing.

The lower end of the hoisting chain 35, usually termed the nose chain, is attached to an anchor plate 39 which is rigidly secured to the front reinforcing bars 30 just at the rear of the plow point. The point of attachment of the chain 35 to the anchor plate 39 is preferably some distance in front of the pivotal connections 34 between the thrust bars 32 and the reinforcing bars 30, as shown more clearly in Figure 2.

The sprocket wheels 36 and shaft 37 constitute what may be termed a winch adapted to be driven by any suitable gears within the housing 38, one of said gears being actuated by an operating shaft 41 extending rearward from the gear case 38 into the cab, indicated at *a*, of the truck, where it is provided with a hand wheel 42 for rotating the same in either direction as desired, and thereby effecting a corresponding movement of the sprocket wheels 36 for winding or unwinding the front chain 35 to effect the raising or lowering of the front end of the plow-supporting frame.

Figure 5:
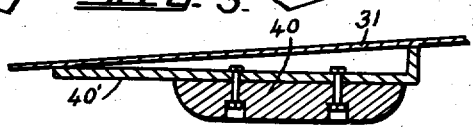
Figure 5 is an enlarged detail sectional view taken in the plane of line 5—5, Figure 4.

The lower bars 31 of the plow-supporting frame are provided with fulcrum shoes 40 bolted to brackets 40′, which are welded or otherwise rigidly secured to the undersides of the bars 31 intermediate their ends, as shown in Figures 2 and 5, whereby the plow-supporting frame rides along and upon the surface of the roadbed on the shoes 40 as the machine is propelled forward.

These fulcrum shoes 40 are preferably located just at the rear of the pivotal connections 34 between the thrust bars 32 and the bars 31 of the plow-supporting frame to allow said plow-supporting frame to tilt vertically to different angles about the fulcrum bearings of the curved rear ends of the shoes 40 upon the roadbed for varying the depth of cut of the cutting plates 28.

If desired, the space between the upper edges of the moldboards 21 adjacent the plow point may be covered by a deflecting plate 43, as shown in Figures 1 and 2, the purpose of which is to deflect snow or ice which may be carried upward to the top of the plow point and thus prevent such snow and ice from passing rearward onto the top of the truck.

A relatively thin cutter plate 44 of hardened steel or equivalent material is rigidly secured to the point of the plow to project forward therefrom for cutting and breaking up any snow, crust or ice in the path of the plow as the truck is propelled forward.

Figure 6:
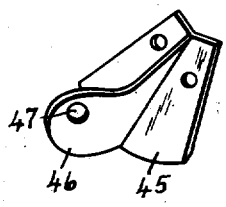
Figure 6 is a detail perspective view of the plow point and draft lug shown in Figures 1 and 2.

The bottom of the plow point is also provided with a bearing plate 45 (shown more clearly in Figure 6) of hardened steel or equivalent material rigidly secured thereto to project forward therefrom between the adjacent ends of the cutting plates 28 and, if desired, may be provided with a forward projecting lug 46 having an aperture 47 for attachment to another truck in case it should be necessary to use additional power for the propulsion of the snow plow through excessive quantities of snow and ice.

*Operation*

When it is desired to use the plow for clearing the roadbed of snow and ice, the chains 25 and 35 will be adjusted so that the fulcrum shoes 40 contact with the road and the plow-supporting frame with the plow thereon assumes a slightly inclined position, as shown by dotted lines in Figure 2, in which position the plow point is tilted up about the curved rear ends of the fulcrum shoes 40 as pivots, the cutting plates 28 are more or less clear of the pavement, and the nose chain 35 is left slack, as shown in Figure 2. The heel chains 25, on the other hand, are taut, as illustrated in Figures 1 and 3, so that the weight of the plow and its frame is borne in part by the shoes 40 and in part by the main frame 1 through the heel chains 25.

Now, if it should be desired to bring the cutting plates 28 into closer relation to the pavement, it would simply be necessary to take up the heel chains 25, thereby causing the plow point to rock downward about the bearing of the fulcrum shoes 40 upon the road, it being understood that this forward and downward tilting movement would be permitted by the slackness of the nose chain 35. On the other hand, by slackening the heel chains 25, the plow point may be tilted upward to reduce the depth of the cut.

When the heel chains 25 are once adjusted to produce the desired depth of cut and it is necessary to cease further operations of the plow, the entire plow-supporting frame with the plow thereon may be easily and quickly raised clear of the road by simply winding the branches 35′ of the nose chain 35 upon the sprockets 36 by the proper rotation of the operating shaft 41, it being understood that this raising of the plow-supporting frame is permitted by the pivoted drive bars 32 between the plow-supporting frame and the main frame 1. Due to the fact that the heel chains 25 are taut throughout the winding up of the nose chain 35, the lifting of the plow is a pivoting movement about the pivots 33. When it is desired to use the plow again, it will be restored to its original depth-of-cut adjustment by simply unwinding the nose chain 35 until it is slack.

In practice, it is usually more convenient to adjust the heel chains 25 to vary the height of the cutting plates 28 above the road while the plow and its supporting frame are lifted entirely off the road. For example, when it is desired to vary the depth of the cut, the plow point is first raised about six inches off the road by winding up the nose chain 35 on the winch. In that condition, the plow has a three-point suspension from the chains 35 and 25. Then one side of the rear of the plow is raised by hand, and a higher or lower link, as required, of the heel chain 25 on that side of the plow is hooked onto the corresponding grab link 26. The same operation is then performed on the other side of the plow, after which the nose chain 35 is unwound until it is slack and the fulcrum shoes 40 rest on the road.

One of the important advantages of the snow plow construction hereinabove described resides in what may be termed its self-ballasting effect when plowing. As snow is removed by the plow, two distinct movements of the snow are blended into one continuous operation—the raising of the snow above the adjoining banks by the riser boards or front portions 21′ of the moldboards and then the carrying or throwing and spreading of the snow to the sides by the upper paneled portions of the moldboards. Raising the snow produces a downward pressure on the snow plow, which pressure, instead of being carried entirely by the shoes 40 under the plow frame, is in large part transferred through the heel chains 25 to the main frame 1 and thence to the front end of the truck. The front wheels of the truck are, therefore, held in better contact with the road surface and any tendency of the front wheels to skid sidewise is largely eliminated. It will be noted also that the snow plow picks up and uses the snow for ballast in direct proportion to the depth of the snow being removed.

It will be evident from the foregoing description and the drawings that the construction is particularly simple, durable, and efficient for the work required, and that the various moving parts may be easily and quickly set or adjusted to the various positions best adapted for the work, but obviously various changes may be made in certain details of the construction without departing from the spirit of the invention.

I claim:

1. In a snow plow of the type in which a plow is connected to a main frame by a thrust bar pivoted at both ends for vertical swinging movement and in which the rear of the plow is supported from the frame by a flexible connection of adjustable length, the improvement which consists in providing the plow with a runner having a curved road-engaging fulcrum at its rear end, said fulcrum being located in front of the point of connection of said flexible connection to said plow, whereby all adjustments of said plow to vary the depth of cut thereof from maximum cut to minimum cut are obtained by lengthening said flexible connection from the length corresponding to maximum cut and thereby causing the plow to tip back about said fulcrum, and whereby part of the downward thrust of the snow when plowing is translated back to said main frame through said adjustable flexible connection.

2. In a snow plow attachment for a motor truck, in combination, a frame adapted to be rigidly secured to the front of a truck, a thrust bar pivoted to said frame for vertical swinging movement and projecting forward therefrom, a plow pivoted to the front end of said thrust bar for vertical swinging movement, a runner secured to the underside of said plow, said runner having a curved road-engaging fulcrum at its rear end and said fulcrum being located in front of the longitudinal center of said plow, whereby said plow when loaded tends to tip back about said fulcrum, and means connected to said frame and to said plow in back of said fulcrum for maintaining said plow in the desired position, said positioning means being under tension when plowing, and said means being adjustable for tilting the plow vertically about said fulcrum to vary the depth of cut of the plow.

3. The combination as claimed in claim 2 in which said adjustable positioning means are flexible, whereby the plow is enabled to follow the contour of the road when in motion.

4. The combination as claimed in claim 2 in which separate adjustable means are connected between said frame and the front of said plow for lifting the plow and runner clear of the road by tilting movement about the pivotal connection between said frame and said thrust bar.

5. The combination as claimed in claim 2 in which said adjustable positioning means are flexible, and in which separate flexible adjustable means are connected between said frame and the front of said plow for lifting the plow and runner clear of the road by swinging movement about the pivotal connection between said frame and said thrust bar, said lifting means being normally slack when plowing.

6. In a snow plow attachment for a motor truck, in combination, a frame adapted to be rigidly secured to the front of a truck, thrust bars pivoted to said frame for vertical swinging movement and projecting forward therefrom, a plow pivoted to the front ends of said thrust bars for vertical swinging movement, said plow having a snow-engaging blade presenting a substantially concave surface to the snow, runners secured to the underside of said plow, said runners having curved road-engaging fulcra at their rear ends and said fulcra being located in front of the longitudinal center of said plow, whereby said plow when loaded tends to tip back about said fulcra, and flexible means connected to said frame and to said plow in back of said fulcra for maintaining said plow in the desired position, said positioning means being adjustable for tilting the plow vertically about said fulcra to vary the depth of cut of the plow, and said means being under tension when plowing, whereby the downward thrust caused by raising the snow on said snow-engaging blade is partly translated back to said frame through said flexible positioning means and thence to the wheels of the truck.

7. The combination as claimed in claim 6, in which separate flexible adjustable means are connected between said frame and the front of said plow for lifting the plow and runners clear of the road by swinging movement about the pivotal connections between said frame and said thrust bars, said flexible lifting means being normally slack when plowing.

8. The combination as claimed in claim 6, in which said plow comprises a pair of snow-engaging blades secured together in angular relationship, and both presenting substantially concave surfaces to the snow.

9. In a snow plow attachment for a motor truck, in combination, a frame adapted to be rigidly secured to the front of a truck, thrust bars pivoted to said frame for vertical swinging movement and projecting forward therefrom, a plow pivoted to the front ends of said thrust bars for vertical swinging movement, said plow comprising a nose and two surfaces extending backward therefrom at an angle to each other and to the direction of movement of the plow, said surfaces each consisting of a riser board and a substantially concave surface above the riser board, said riser boards lifting the snow and carrying it upward into the concave surfaces and the latter throwing the snow laterally away from the plow, runners secured to the underside of said plow, said runners having curved road-engaging fulcra at their rear ends and said fulcra being located in front of the longitudinal center of said plow, whereby said plow when loaded tends to tip back about said fulcra, means comprising two flexible connections between said frame and the two sides of said plow at points in back of said fulcra for maintaining said plow in the desired position, said two flexible connections being adjustable in length for tilting the plow vertically about said fulcra to vary the depth of cut of the plow, and means comprising a separate flexible connection between said frame and the front of said plow for lifting the plow and runners clear of the road by swinging movement about the pivotal connections between said frame and said thrust bars, said lifting means being normally slack and said positioning means being under tension when plowing, whereby the downward thrust caused by raising the snow is partly translated back to said frame through said flexible positioning means and thence to the wheels of the truck.

CARL H. FRINK.